United States Patent [19]
Sasse

[11] Patent Number: 6,102,174
[45] Date of Patent: Aug. 15, 2000

[54] HYDRODYNAMIC TORQUE CONVERTER WITH A TORSIONAL VIBRATION DAMPER ARRANGED IN THE INNER TORUS

[75] Inventor: Christoph Sasse, Schweinfurt, Germany

[73] Assignee: Mannesmann Sachs AG, Schweinfurt, Germany

[21] Appl. No.: 09/315,559

[22] Filed: May 20, 1999

[30] Foreign Application Priority Data

May 29, 1998 [DE] Germany .......................... 198 24 265

[51] Int. Cl.⁷ .............................. F16D 33/00; F16H 45/02
[52] U.S. Cl. ...................... 192/3.28; 192/3.25; 192/3.29
[58] Field of Search .................... 192/3.25, 3.26, 192/3.28, 3.29, 3.3, 3.31; 74/572, 574; 60/341, 342

[56] References Cited

U.S. PATENT DOCUMENTS

| 4,043,223 | 8/1977 | Ohnuma et al. |
|---|---|---|
| 5,857,934 | 1/1999 | Ohkubo .................................... 475/44 |

FOREIGN PATENT DOCUMENTS

| 35 31 521 A1 | 3/1987 | Germany ........................ F16H 41/24 |
|---|---|---|
| 41 21 586 A1 | 1/1993 | Germany ........................ F16H 45/02 |
| 44 24 988 C1 | 6/1995 | Germany ........................ F16H 45/02 |
| 2269440 | 2/1994 | United Kingdom ................... 192/212 |

*Primary Examiner*—Rodney H. Bonck
*Assistant Examiner*—Tisha D. Waddell
*Attorney, Agent, or Firm*—Cohen, Pontani, Lieberman & Pavane

[57] ABSTRACT

A hydrodynamic torque converter with a converter circuit having at least an impeller wheel, a turbine wheel with a turbine hub, and a stator wheel, which together enclose an inner torus. A torsional vibration damper arranged within the inner torus is operably connected with a control disk that is connected with a driven shaft so as to be fixed with respect to rotation relative to it. The torque converter is further constructed with a lockup clutch by which can transmit a torque provided by a drive while bypassing the converter circuit. A controlling system for the torsional vibration damper is provided on the drive side of the turbine wheel and the control disk which has a driven-side controller for the torsional vibration damper, is arranged so as to be fixed with respect to rotation relative to the turbine hub but rotatable relative to the turbine wheel. The turbine hub is connected with the driven shaft guided in the converter housing such that the turbine hub is fixed with respect to rotation relative to the driven shaft.

8 Claims, 3 Drawing Sheets

HYDRODYNAMIC TORQUE CONVERTER WITH A TORSIONAL VIBRATION DAMPER ARRANGED IN THE INNER TORUS

BACKGROUND OF THE INVENTION

1. Field of the Invention

The present invention relates to hydrodynamic torque converters, and more particularly, to a hydrodynamic torque converter having a torsional vibration damper arranged in the inner torus.

2. Description of the Related Art

U.S. Pat. No. 4,043,223 discloses a hydrodynamic torque converter with a converter circuit comprising an impeller wheel, a turbine wheel with a turbine hub, and a stator wheel which together enclose an inner torus in which a torsional vibration damper is arranged. The torsional vibration damper is operably connected with the impeller wheel on one side and with a control disk on the other side. The control disk is connected with an automatic transmission via a first driven shaft so as to be fixed with respect to rotation relative to the automatic transmission. The above-mentioned turbine wheel is connected with a second driven shaft via its turbine hub so as to be fixed with respect to rotation relative to the driven shaft which, similar to the first driven shaft, acts as a transmission input shaft of the automatic transmission which has a clutch for each of the two driven shafts. In defined switching states of these clutches, there is a lockup clutch function by means of which a torque provided by a drive can be transmitted to the transmission while bypassing the converter circuit.

An automatic transmission with two transmission input shafts is referred to in the technical art as a power-dividing transmission. In the transmission according to the '223 patent, there is a first, purely hydrodynamic operating mode in which both clutches are open in the transmission. In the first operating mode, torque received by the drive is transmitted from the impeller wheel via the turbine wheel to the driven shaft associated therewith, and torsional vibrations are damped by the converter circuit. In a second, power-dividing operating mode, however, one of the two clutches is closed and the other is opened, so that a portion of the introduced torque reaches the transmission in the manner described above via the converter circuit, while a second portion of the torque is transmitted from the impeller wheel via the torsional vibration damper and the control disk into the transmission. In a third operating mode/state, the opening and closing states of the two clutches are exchanged compared with the power-dividing operating state and, as a result, the introduced torque is transmitted into the transmission exclusively via the torsional vibration damper and control disk while bypassing the converter circuit. Since the converter circuit is incapable of taking over any vibration-damping function in the third operating state, the torsional vibration damper must compulsorily be connected with the impeller wheel in order to take over this function.

Based on the embodiment of the hydrodynamic torque converter with two driven shafts addressed in the '223 patent, an arrangement of the torsional vibration damper in conventional manner, that is, axially between a drive-side radial flange of the converter housing and the turbine wheel, is generally problematic with respect to design. The problem is that it would then be necessary to axially engage over the turbine hub in order to make a connection between the torsional vibration damper and the associated driven shaft which radially encloses the-driven shaft of the turbine wheel. For this reason, the torsional vibration damper must be arranged in the inner torus of the converter circuit.

Another hydrodynamic torque converter for a power-dividing automatic transmission is shown in DE 35 31 521 A1. The automatic transmission mentioned above (i.e., U.S. Pat. No. 4,023,223) is very complicated in terms of construction and is therefore very expensive, for which reason it is only applied in modern vehicles in isolated cases. On the other hand, hydrodynamic torque converters such as those described, for example, in DE 41 21 586 A1, e.g., in FIG. 1, are used for conventionally constructed automatic transmissions having only one transmission input shaft. In a torque converter of this kind, the piston of a lockup clutch is axially arranged between a drive-side radial flange of the converter housing and the turbine wheel, and is operably connected with the turbine hub via a torsional vibration damper which is disposed axially between the piston and the turbine wheel. Torque that has reached the piston from the radial flange of the converter housing via a friction lining provided at the piston is accordingly conducted via the torsional vibration damper, to the turbine hub and from the turbine hub, due to its tooth engagement with the transmission input shaft, to the transmission input shaft and thus enters into the transmission while bypassing the converter circuit. In a second possible switching state, on the other hand, the torque is conducted via the converter circuit to the turbine hub and the transmission input shaft and enters the transmission.

The simple construction of this torque converter is offset by the following disadvantages: Modern hydrodynamic torque converters must be constructed so as to be extremely narrow axially because the space available in the vehicle for their installation is constantly decreasing. Because of the considerable axial space requirement for the torsional vibration damper between the piston and the turbine wheel, installation space must be saved in that the impeller wheel and turbine wheel and accordingly the converter circuit are increasingly built so as to be narrower in the axial direction. This worsens the flow ratios in the converter circuit and results in a decrease in efficiency. In addition, in order to limit the axial space requirement of the torsional vibration damper, the latter is provided with springs of relatively small diameter. The rigidity of these springs must be correspondingly high, so that the torsional vibration damper can exercise only a limited damping behavior, especially with torsional vibrations of low frequency. This disadvantage can be mitigated in that the torsional vibration damper is placed very far to the radial outside as in DE 44 24 988 A1, but there is also not an optimum damping behavior in this case.

SUMMARY OF THE INVENTION

It is therefore an object of the invention to construct a hydrodynamic torque converter such that a torsional vibration damper associated with a lockup clutch provides optimum damping behavior with the lowest possible space requirement.

For the first time in a construction of a hydrodynamic torque converter with only one driven shaft, that is, with one transmission input shaft, a torsional vibration damper is arranged in the inner torus of the converter housing. As a result of this step, almost all of the axial installation space in the converter housing is available for the impeller wheel and turbine wheel and accordingly for the converter circuit. Thus, the converter circuit can be constructed so as to be almost circular with respect to cross-sectional shape. This results in optimum flow conditions in the converter circuit and accordingly in an extremely high efficiency. This efficiency is negligibly influenced by the control disk projecting into the passage area of the converter flow because this control disk is provided with recesses inside of the above-mentioned passage area and there is therefore only little resistance to flow.

Because of the almost circular cross section of the converter circuit which is now made possible, an axially very wide inner torus is obtained in which a torsional vibration damper having an extremely large spring diameter can be received without difficulty. Due to the large spring diameter, the springs can be constructed with low rigidity, so that comparatively low-frequency torsional vibrations can also be damped in an excellent manner. In addition, the large possible spring diameter itself, improves the damping behavior almost by a factor of 2 compared to a conventional arrangement of the torsional vibration damper axially between a piston of the lockup clutch and the turbine wheel, even when the torsional vibration damper is to be arranged in the circumferential area of the piston as in the above-cited DE 44 24 988 A1. In this respect, it is also noted that when the torsional vibration damper is arranged in the inner torus of the converter circuit, the springs are already arranged relatively far outside because both the impeller wheel and the turbine wheel have their narrowest area radially outside of the inner torus.

As a result of the torsional vibration damper arranged in the inner torus of the converter circuit in combination with only one driven shaft with which the output part of the torsional vibration damper is connected so as to be fixed with respect to rotation relative to it, the control disk associated with the torsional vibration damper is fixedly connected with the turbine hub which is fixedly connected with the driven shaft. In contrast, the turbine wheel is rotatably supported relative to the turbine hub and therefore relative to the control disk, so that the torsional vibration damper can be used during the transmission of torque via the converter circuit as well as when the converter circuit is bypassed while utilizing the lockup clutch. Accordingly, a deflection of the turbine wheel, regardless of how the torque is introduced, will always result in a loading of the springs of the torsional vibration damper which is supported at the other end at the control disk and accordingly at the turbine hub. Every movement of the turbine wheel relative to the turbine hub will therefore start the torsional vibration damper in operation in a compulsory manner.

The torsional vibration damper is preferably constructed with sliding guides for the springs, so that a particularly low-friction movement of the springs can be achieved. A guide ring which projects into the inner torus and has a guide path for the sliding guides at its radial inner side is fastened to the turbine wheel to receive these sliding guides. This embodiment of the torsional vibration damper is an advantageous one, but is not the only possible embodiment. It is also be possible for springs which are pre-curved or curved forward in the circumferential direction to directly contact the guide path of the guide ring and to dispense with the sliding guides. This step would reduce costs on the one hand and would make it possible for the springs of the torsional vibration damper to be displaced radially outward on the other hand. This would result in even larger spring paths. Controlling means for the springs of the torsional vibration damper can be produced in a particularly simple manner while economizing on costs and material in that indentations are formed at the turbine wheel and at the guide ring.

In accordance with another embodiment, it is possible to further improve the described advantageous embodiment of the hydrodynamic torque converter in that a planetary gearset is associated with the lockup clutch. In this planetary gearset, the drive-side radial flange of the converter housing, as well as the piston of the lockup clutch, can serve as a planetary carrier for receiving at least one planetary gear which is connected via a toothing with a ring gear on the one hand and via a toothing with the driven shaft acting as sun gear on the other hand. The ring gear is preferably supported in a floating manner in the circumferential direction and serves to build up a particularly high dynamic mass moment of inertia against torsional vibrations. Moreover, the planetary gearset can serve as a transmission stage between the input and output of the torque converter by means of which a predetermined speed ratio can be produced between the input and output when, for example, a controllable brake fastened to the converter housing is associated with the ring gear. When the drive-side radial flange of the converter housing is constructed as a planetary carrier, there is the advantage that all of the teeth of the above-mentioned toothing are always used and therefore wear evenly, wherein this wear is very low. Further, the dynamic mass moment of inertia is accordingly active on the drive side also when the lockup clutch is open, so that torsional vibrations occurring at the drive are effectively damped as soon as they occur and the front of the engine is accordingly relieved so that additional units connected thereto can be driven in a conserving manner. However, it is preferable that the piston of the lockup clutch is constructed as a planetary carrier when the planetary gearset acts only when the lockup clutch is closed.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

In the drawings, wherein like reference characters denote similar elements throughout the several views.

DETAILED DESCRIPTION OF THE PRESENTLY PREFERRED EMBODIMENTS

Figure 1:
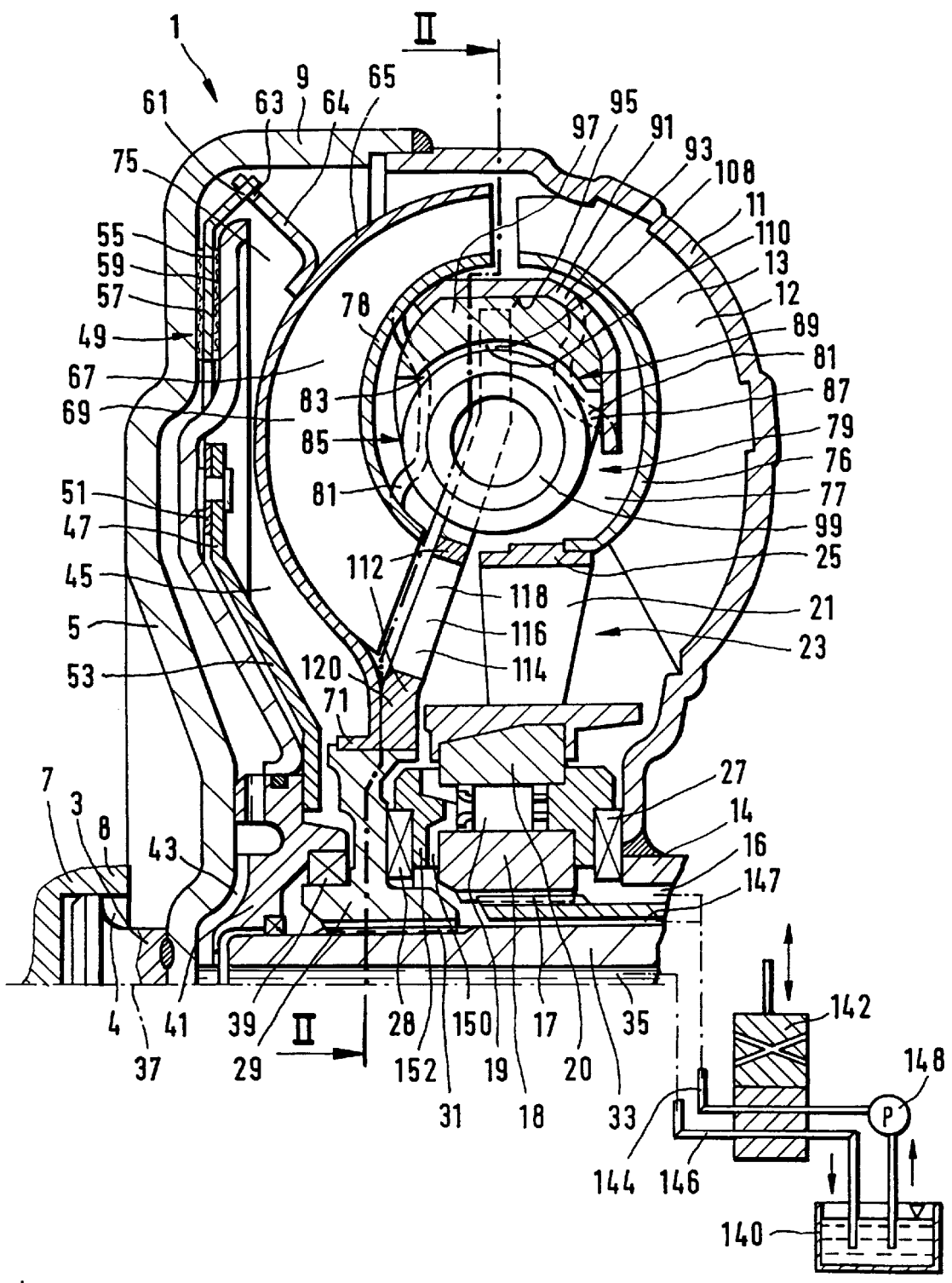
FIG. 1 is a radial sectional-view of a hydrodynamic torque converter with a torsional vibration damper arranged in the inner torus of the converter circuit according to an embodiment of the present invention.

FIG. 1 shows a hydrodynamic torque converter with a converter housing 1 having in the area of an axis of rotation 37 a bearing journal 3 which engages in a cutout 4 of a drive 7, for example, the crankshaft 8 of an internal combustion engine. The bearing journal 3 is fastened to a drive-side radial flange 5 of the converter housing 1 which, in its circumferential area, passes into an axial shoulder 9. An impeller shell 11 which carries a blade arrangement 12 and accordingly serves as impeller wheel 13 is fastened to the axial shoulder 9. Fastened in the radial inner area of the impeller shell 11 is an impeller hub 14 which radially encloses a sleeve 15 while forming an annular channel 16.

The sleeve 15 is in a rotational connection via a toothing 17 with an inner ring 18 of a freewheel 19 whose outer ring 20 serves to receive blades 21 of a stator wheel 23 which is supported on the transmission side by means of the above-mentioned sleeve 15. The blades 21 of the stator wheel 23 are connected with one another by a circumferential ring 25.

The stator wheel 23 is axially secured at both sides by axial bearings 27 and 28, wherein axial bearing 27 is arranged between the impeller shell 11 and the freewheel 19 and axial bearing 28 is arranged between the freewheel 19 and the turbine hub 29. The turbine hub 29 is connected via a toothing 31 with a driven shaft 33 so as to be fixed with respect to rotation relative to it, wherein the driven shaft 33 acts as a transmission input shaft of an automatic transmission, not shown. The driven shaft 33 has a center bore 35 adjoined at the axial free end of the driven shaft by channels 43 which are formed in a housing hub 41 and lead radially outward. The housing hub 41 receives the turbine hub 29 mentioned above via a bearing 39. Further, the housing hub 41 has a piston 47 of a lockup clutch 49 in the circumferential area. Piston 47 defines a chamber 45 axially between itself and the radial flange 5 of the converter housing 1. Chamber 45 is connected on the radial inside to center bore 35 of the driven shaft 33 via the channels 43 of the housing hub 41 and extends radially outward up to a plate 55 which is arranged axially between the radial flange 5 and the piston 47. Plate 55 has friction linings 57 and 59 on both sides. The piston 47 is connected, via tangential leaf springs 51, with a supporting ring 53 which is fastened to the housing hub 41 on the radial inside, preferably by a weld. By means of this connection with the supporting ring 53, it is possible for the piston 47 to move in the axial direction because of the axial flexibility of the tangential leaf springs 51, while the piston is arranged so as to be fixed with respect to rotation in the circumferential direction.

The plate 55 is formed as a toothed rim 61 in the circumferential area and is connected with a toothed rim 63 of a bracket or yoke 64 fastened to a turbine shell 65, via rim 61, so as to be fixed with respect to rotation to the turbine shell 65. The turbine shell 65 has blades 67 to form a turbine wheel 69. Turbine wheel 69, together with the stator wheel 23 and the impeller wheel 13, forms a hydrodynamic converter circuit 75 which encloses an inner torus 77 by inner walls 76 at the impeller wheel 13 and 78 at the turbine wheel 69. Inner torus 77 serves to receive a torsional vibration damper 79 which is also clearly shown in FIG. 2 as well as in FIG. 1 and will be described more fully in the following.

Figure 2:
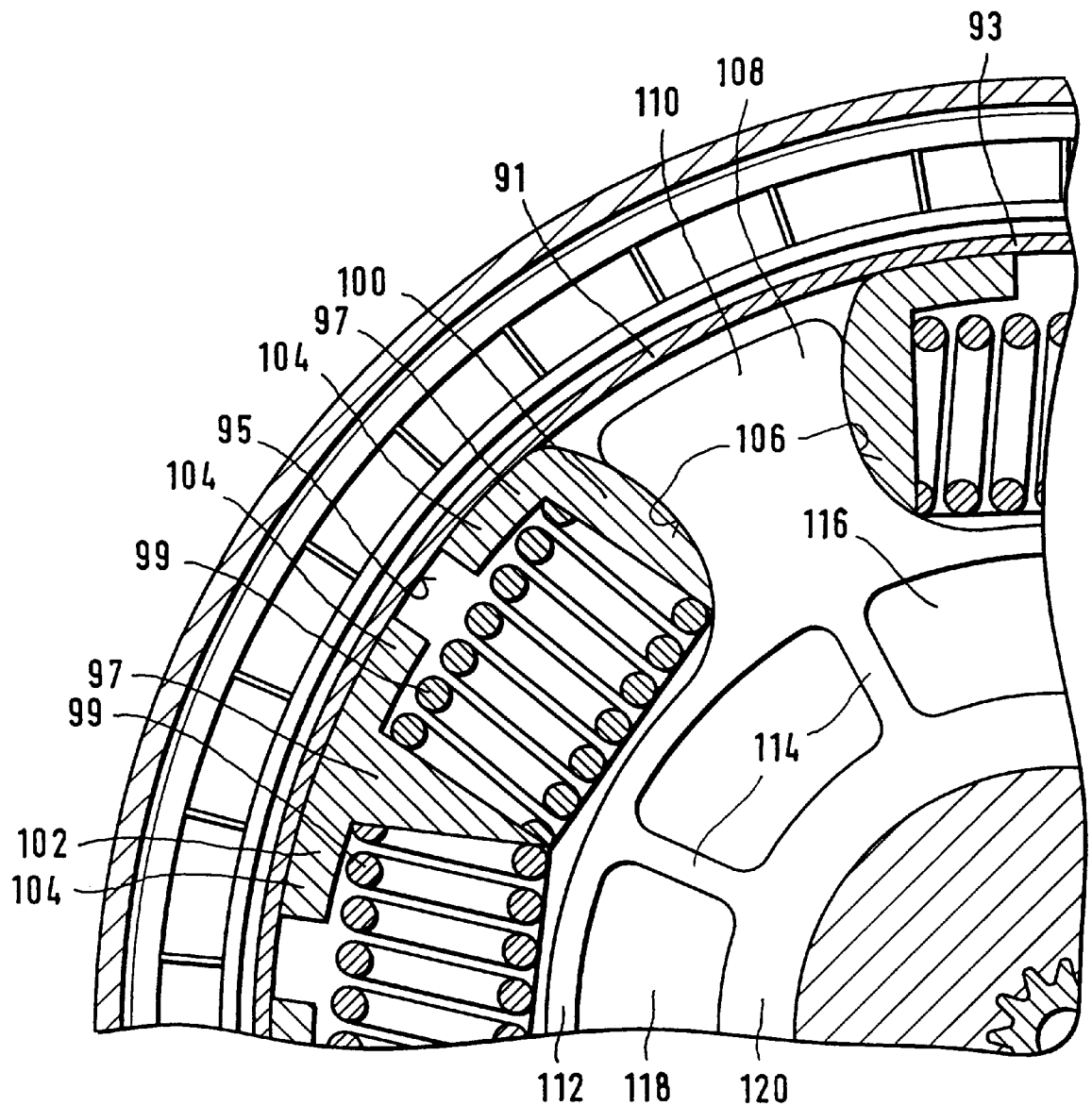
FIG. 2 is a partial cross-sectional view of the torque converter according to section line II—II in FIG. 1.

Indentations 85 which are offset in the circumferential direction are formed at the inner wall 78 of the turbine wheel 69, wherein these indentations are formed by a yoke 83 which engages in the inner torus 77. Each of these yokes 83 serves as drive-side controlling means 81 for springs 99 of the torsional vibration damper 79. Further, a holder 91 is fastened to the inner wall 78 of the turbine wheel 69, and includes at its free end on the impeller side, indentations 89 which are offset in the circumferential direction and extend in the direction of the springs 99. Indentations 89 also have the shape of a yoke 87 and serve as drive-side controlling means 81. The holder 91 is constructed as a guide ring 93 and for this purpose has a guide path 95 at the inner side of its circumference for sliding guides 97 as can be seen in FIG. 2. The drive-side controlling means 81 includes circumferential control edges, not shown, which contact a spring cup, wherein a spring cup of this kind is provided with reference number 100 in FIG. 2, although this spring cup is not shown in contact with the drive-side controlling means 81 in FIG. 2. The spring cup 100 receives one end of a spring 99 at its circumferential side remote of the control edges, with the opposite end of spring 99 being supported at a sliding block 102 which, in contrast to the spring cup, has circumferential projections 104 projecting in two opposite circumferential directions. Following a plurality of sliding blocks 102 of this kind with springs 99 arranged therebetween is the spring cup 100 shown in FIG. 2 which is supported on its circumferential side at a control area 106 remote from the spring 99 by a finger 110 of a control disk 120. Finger 110 projects radially outward and acts as driven-side controlling means 108 for the torsional vibration damper 79. The control disk 120 has a plurality of fingers 110 which are offset along the circumference and whose radial inner end passes into a ring 112 which has a radial inner connection via radial webs 114 and has a recess 116, viewed in the circumferential direction, between every two radial webs 114. These recesses 116 are arranged in the passage area 118 of the converter flow between the turbine wheel 69 and stator wheel 23 and only impede flow to a negligible degree since the radial webs 114 are constructed so as to be very narrow relative to the recesses 116. The control disk 120 is connected at its inner circumference with the turbine hub 29 so as to be fixed with respect to rotation relative to it. In contrast, the turbine shell 65 and accordingly the turbine wheel 69 are mounted on the turbine hub 29 via a turbine foot 71 so as to be rotatable but secured axially.

FIG. 1 shows a reservoir 140 for converter fluid which is connected with the hydrodynamic torque converter by a pump 148 and a switching valve 142 via lines 144 and 146. One of the lines leads to the channel 16 between the impeller hub 14 and the sleeve 15 and to an annular channel 147 radially between the sleeve 15 and the driven shaft 33, while the other line is connected with the center bore 35 of the driven shaft 33.

In a first position of the switching valve 142, converter fluid is conveyed from the pump 148 into the center bore 35 of the driven shaft 33 and travels from there via the channels 43 of the converter hub 41 into the chamber 45, so that the chamber 45 puts the converter circuit 75 under pressure. As a result of this, the piston 47 of the lockup clutch 49 is lifted from the radial flange 5 of the converter housing 1, so that torque conducted from the drive 7 to the converter housing 1 is transferred from the impeller wheel 13 to the turbine wheel 69 due to the flow connection between the impeller wheel 13 and the turbine wheel 69. The turbine wheel 69 acts on and deforms the springs 99 by its drive-side controlling means 81 via the spring cups 100. Springs 99 are supported at the driven-side controlling means 108 of the control disk 120 via the sliding blocks 102 which, like the spring cups 100, also serve as sliding guides 97. When springs 99 are deformed, the sliding guides 97 move along the guide path 95 of the guide ring 93. When springs 99 are supported at the control disk 120, the control disk is deflected in the circumferential direction and, because it is connected with the turbine hub 29 so as to be fixed with respect to rotation relative to it, transfers the transmitted torque to the turbine hub 29 and accordingly to the driven shaft 33.

As soon as the switching valve 142 is moved into its other position, the channels 16 and 147 are supplied with converter fluid by the pump 148. The converter fluid arrives in the converter circuit 75, especially along a radial passage 150, at a support disk 152 for the radial bearing 28. At the same time, converter fluid flows radially inward out of the chamber 45 via the channels 43 in the converter hub 41 due to the absence of pressure in the center bore 35 of the driven shaft 33. Owing to the existing overpressure in the converter circuit 75, the piston 47 is displaced against the action of the tangential leaf springs 51 in the direction of the radial flange 5 and thus generates a frictional engagement with the radial flange via the plate 55 with its friction linings 57 and 59. A torque present at the converter housing 1 is then conducted via the friction lining 57 to the plate 55 and from the plate, via the yoke 64 and the turbine wheel 69, to the torsional vibration damper 79. Proceeding from the torsional vibration damper 79, the transmission of torque is carried out in the manner described above via the sliding guides 97 and the springs 99 to the control disk 120 and from the control disk, via the turbine hub 29, to the driven shaft 33. The torsional vibration damper 79 thus acts independently from the respective operating state of the torque converter.

Figure 3:
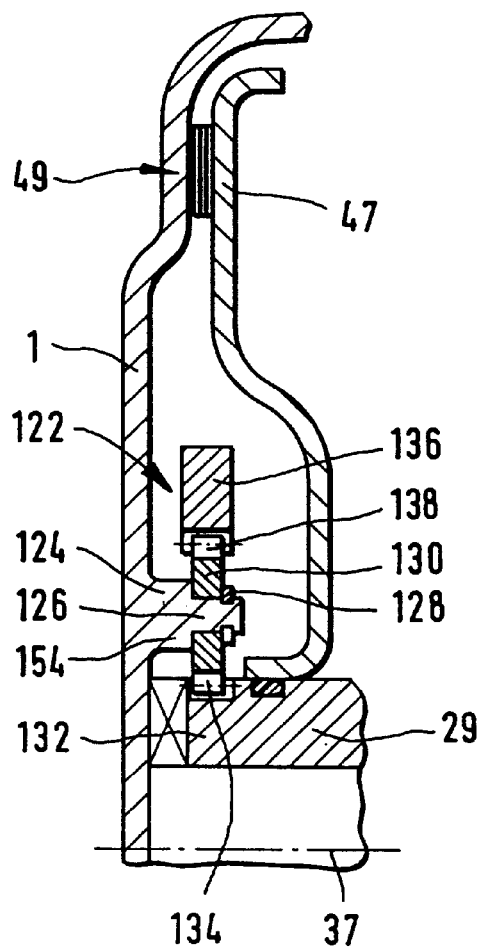
FIG. 3 is a detailed view of the area of the lockup clutch with a planetary gearset in which a radial flange of the converter housing acts as a planetary carrier according to the invention.
Figure 4:
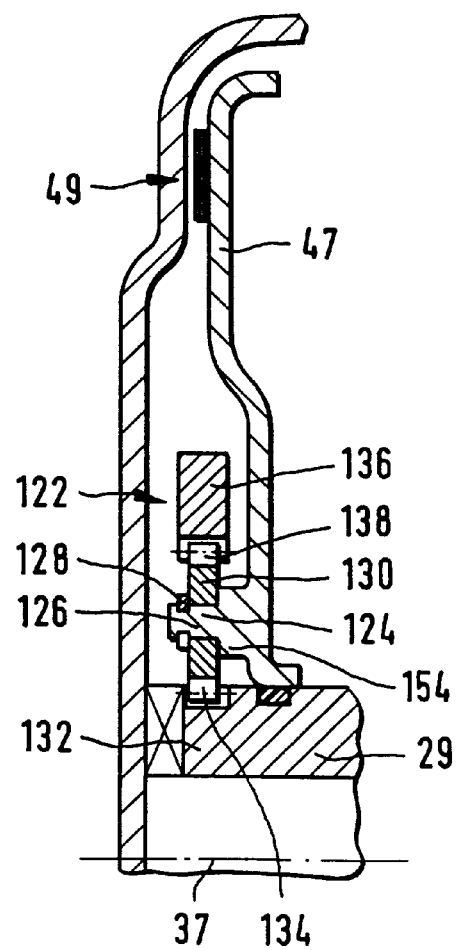
FIG. 4 corresponds to FIG. 3 and shows the construction of a piston of the lockup clutch as a planetary carrier.

FIGS. 3 and 4 show special further developments of the lockup clutch 49, wherein the further developments make their advantages noticeable with respect to the reaction on the drive 7 because, owing to a higher dynamic mass moment of inertia, torsional vibrations occurring in the drive 7 are already damped. For this purpose, the lockup clutch 49 is provided with a planetary gearset 122 which has a plurality of planetary gears 130 distributed along its circumference. As shown in FIG. 3, these planetary gears are supported in each instance on a journal 126 which is fastened to the radial flange 5 in a manner not shown, so that the radial flange acts as a planetary carrier 124. The planetary gears 130 are secured against axial movement on the one hand by a radial enlargement 154 at the journal 126 and on the other hand by axial securing means 128, for example, in the form of a snap ring engaging in a circumferential groove of the journal 126. The planetary gears 130 are rotatably connected with the turbine hub 29 via a toothing 134, wherein the turbine hub 29 acts as a sun gear 132 of the planetary gearset 122. The planetary gears 130 are in a rotational connection with a ring gear 136 via another toothing 138. Although is not shown in FIG. 3 for the sake of simplicity, ring gear 136 is axially secured in a floating manner in the circumferential direction. The ring gear 136 causes an increase in the dynamic mass moment of inertia.

In contrast to FIG. 3, FIG. 4 shows an embodiment in which the piston 47 of lockup clutch 49 acts as a planetary carrier 124. In a corresponding manner, the journals 126 are provided for receiving the planetary gears 130 at the piston 47. The construction of the journals 126 themselves and the axial securing means 128 for planetary gear 130 and ring gear 136 is carried out in the same manner as in FIG. 3 and will therefore not be discussed further.

The invention is not limited by the embodiments described above which are presented as examples only but can be modified in various ways within the scope of protection defined by the appended patent claims.

I claim:

1. A hydrodynamic torque converter comprising:
   a converter circuit comprising at least an impeller wheel, a turbine wheel having a turbine hub and a stator wheel;
   an inner torus formed by said converter circuit;
   a torsional vibration damper arranged in said inner torus;
   a control disk in working connection with said torsional vibration damper and being connected to a driven shaft so as to be fixed with respect to rotation relative to it, said control disk being arranged so as to be torsionally fixed to the turbine hub and rotatable with respect to the turbine wheel;
   a lockup clutch operably connected to said control disk and transmitting torque provided by a drive while bypassing said converter circuit; and
   first control means disposed at the turbine wheel for controlling the torsional vibration damper;
   wherein the turbine hub is connected with the driven shaft guided in a converter housing such that the turbine hub is torsionally fixed to the driven shaft, said turbine wheel being rotatably arranged on the turbine hub.

2. A hydrodynamic torque converter comprising:
   a converter circuit comprising at least an impeller wheel, a turbine wheel having a turbine hub and a stator wheel;
   an inner torus formed by said converter circuit;
   a torsional vibration damper arranged in said inner torus;
   a control disk in working connection with said torsional vibration damper and being connected to a driven shaft so as to be fixed with respect to rotation relative to it, said control disk being arranged so as to be torsionally fixed to the turbine hub and rotatable with respect to the turbine wheel said control disk comprising:
      a plurality of radial webs radially extending from a central portion of said control disk: and
      a plurality of recesses in a radial passage region of converter flow between every two of said plurality of radial webs:
   a lockup clutch operably connected to said control disk and transmitting torque provided by a drive while bypassing said converter circuit;
   first control means disposed at the turbine wheel for controlling the torsional vibration damper;
   wherein the turbine hub is connected with the driven shaft guided in a converter housing such that the turbine hub is torsionally fixed to the driven shaft; and
   second control means radially arranged outside said recesses of said control disk for controlling said torsional vibration damper, said second control means comprising fingers formed with said control disk and extending radially outward therefrom, said fingers having control areas facing a circumferential direction for the torsional vibration damper.

3. The hydrodynamic torque converter in accordance with claim 2, wherein said torsional vibration damper comprises:
   a guide ring circumferentially arranged along an inner wall of said inner torus;
   a guide path arranged at a radial inner side of said guide ring;
   sliding guides supported on said guide path; and
   springs supported by said sliding guides.

4. The hydrodynamic torque converter in accordance with claim 3, wherein said guide ring is fastened to the turbine wheel and projects into said inner torus of the converter circuit.

5. The hydrodynamic torque converter in accordance with claim 3, wherein said turbine wheel comprises indentations formed on an inner wall thereof and which project into said inner torus, said indentations acting as a drive-side controlling means for said springs.

6. The hydrodynamic torque converter in accordance with claim 3, further comprising indentations formed at said guide ring in the direction of said springs, said indentations acting as drive side controlling means for the torsional vibration damper.

7. A hydrodynamic torque converter comprising:
   a converter circuit comprising at least an impeller wheel, a turbine wheel having a turbine hub and a stator wheel;
   an inner torus formed by said converter circuit;
   a torsional vibration damper arranged in said inner torus;
   a control disk in working connection with said torsional vibration damper and being connected to a driven shaft so as to be fixed with respect to rotation relative to it, said control disk being arranged so as to be torsionally fixed to the turbine hub and rotatable with respect to the turbine wheel;

a lockup clutch operably connected to said control disk and transmitting torque provided by a drive while bypassing said converter circuit;

first control means disposed at the turbine wheel for controlling the torsional vibration damper;

wherein the turbine hub is connected with the driven shaft guided in a converter housing such that the turbine hub is torsionally fixed to the driven shaft;

a planetary gearset associated with said lockup clutch and having at least one planetary gear rotatably supported at the converter housing;

a sun gear formed by said turbine hub; and a ring gear operably engaging said planetary gear and being mounted in a floating manner in the circumferential direction.

8. The hydrodynamic torque converter in accordance with claim 1, further comprising:

a planetary gearset associated with said lockup clutch and having at least one planetary gear rotatably supported at a piston of said lockup clutch;

a sun gear formed by said turbine hub; and a ring gear operably engaging said planetary gear and being circumferentially mounted in a floating manner.

* * * * *